United States Patent
Pellacini et al.

(10) Patent No.: US 7,652,666 B2
(45) Date of Patent: *Jan. 26, 2010

(54) HYBRID HARDWARE-ACCELERATED RELIGHTING SYSTEM FOR COMPUTER CINEMATOGRAPHY

(75) Inventors: Fabio Pellacini, Hanover, NH (US);
Kiril Vidimce, San Francisco, CA (US);
Alex J. Mohr, Oakland, CA (US)

(73) Assignee: Pixar, Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/207,792

(22) Filed: Sep. 10, 2008

(65) Prior Publication Data

US 2009/0073169 A1 Mar. 19, 2009

Related U.S. Application Data

(63) Continuation of application No. 11/368,326, filed on Mar. 2, 2006, now Pat. No. 7,427,986.

(60) Provisional application No. 60/658,462, filed on Mar. 3, 2005.

(51) Int. Cl.
*G06T 15/50* (2006.01)
(52) U.S. Cl. ........................ 345/426; 345/421; 345/423; 345/427; 345/473; 345/503
(58) Field of Classification Search ................ 345/423, 345/426, 473, 503, 421, 427
See application file for complete search history.

(56) References Cited

OTHER PUBLICATIONS

Barzel, R., "Lighting Controls for Computer Cinematography," Journal of Graphics Tools, 2(1):1-20 (1997).
Briere et al., "Heirarchical View-dependent Structures for Interactive Scene Manipulation," Proc. SIGGRAPH '96, pp. 89-90 (1996).
Cook et al., "The Reyes Image Rendering Architecture," Computer Graphics, 21:95-102 (1987).
Everitt, C., "Interactive order-independent transparency," NVIDIA White Paper (2001).
Gershbein et al., "A fast relighting engine for interactive cinematic lighting design," Proceedings of ACM SIGGRAPH 2000, Computer Graphics Proceedings, Annual Conference Series, pp. 353-358 (2000).
Gleicher et al., "Through-the-lens camera control," Computer Graphics (Proceedings of SIGGRAPH 92), 26(2):331-340 (1992).
Guenter et al., "Specializing shaders," Proceedings of ACM SIGGRAPH 95, Computer Graphics Proceedings, Annual Conference Series, pp. 343-349 (1995).

(Continued)

*Primary Examiner*—Kimbinh T Nguyen
(74) *Attorney, Agent, or Firm*—Townsend and Townsend and Crew LLP

(57) ABSTRACT

An interactive cinematic lighting system used in the production of computer-animated feature films containing environments of very high complexity, in which surface and light appearances are described using procedural RenderMan shaders. The system provides lighting artists with high-quality previews at interactive framerates with only small approximations compared to the final rendered images. This is accomplished by combining numerical estimation of surface response, image-space caching, deferred shading, and the computational power of modern graphics hardware.

14 Claims, 5 Drawing Sheets
(2 of 5 Drawing Sheet(s) Filed in Color)

OTHER PUBLICATIONS

Horwitz et al., "Interprocedural slicing using dependence graphs," ACM Transactions on Programming Languages and Systems (TOPLAS), 12(1):26-60 (1990).

Horwitz et al., "Interprocedural Slicing Using Dependence Graphs," Proc. SIGPLAN '88, from Conference on Programming Language Design and Impementation held in Atlanta, Georgia, Jun. 22-24, 1988, pp. 35-46 (1988).

Lastra et al., "Real-Time Programmable Shading," 1995 Symposium on Interactive 3D Graphics, pp. 59-66, abstract only, pp. 1-8 (1995).

Lokovic et al., "Deep shadow maps," Proceedings of ACM SIGGRAPH 2000, Computer Graphics Proceedings, Annual Conference Series, pp. 385-392 (2000).

Mark et al., "Cg: A system for programming graphics hardware in a C-like language," ACM Transactions on Graphics, 22(3): 896-907 (2003).

NG et al., "All-frequency shadows using nonlinear wavelet ligting approximation," ACM Transactions on Graphics, 22(3): 376-381 (2003).

NG et al., "Triple product wavelet integrals for all frequency relighting," ACM Transactions on Graphics, 23(3):477-487 (2004).

Peercy et al., "Interactive multi-pass programmable shading," In Proceedings of ACM SIGGRAPH 2000, Computer Graphics Proceedings, Annual Conference Series, pp. 425-432 (2000).

Pellacini et al., "A user interface for interactive cinematic shadow design," ACM Trans-actions on Graphics, 21(3):563-566 (2002).

Proudfoot et al., "A real-time procedural shading system for programmable graphics hardware," Proceedings of ACM SIGGRAPH 2001, Computer Graphics Proceedings, Annual Conference Series, pp. 159-170 (2001).

Ragan-Kelley J. M., "Practical interactive lighting design for RenderMan scenes," Undergraduate thesis, Stanford University (2004).

Reeves et al., "Rendering antialiased shadows with depth maps," Computer Graphics (Proceedings of SIGGRAPH 87), 21: 283-291 (1987).

Riffel et al., "Mio: Fast multi-pass partitioning via priority-based instruction scheduling," Graphics Hardware, Akenine-Moller et al., eds., pp. 35-44 (2004).

Saito et al., "Comprehensible rendering of 3D shapes," ACM SIGGRAPH Computer Graphics, 24(4):197-206 (1990).

Sequin et al., "Parameterized ray tracing," Computer Graphics, 23(3):307-314 (1989).

Sloan et al., "Precomputed radiance transfer for real-time rendering in dynamic, low-frequency lighting, environments," ACM Transactions on Graphics, 21(3):477-487 (2002).

Tabellion et al., "An approximate global illumination system for computer generated films," ACM Transactions on Graphics, 23(3):469-476 (2004).

Tole et al., "Interactive global illumination in dynamic scenes," ACM Transactions on Graphics, 21(3):537-546 (2002).

International Search Report of Jun. 12, 2008 in PCT/US06/07618.

Written Opinion of Jun. 12, 2008 in PCT/US06/07618.

HYBRID HARDWARE-ACCELERATED RELIGHTING SYSTEM FOR COMPUTER CINEMATOGRAPHY

CROSS-REFERENCES TO RELATED APPLICATIONS

This application is a continuation of application Ser. No. 11/368,326, filed Mar. 2, 2006, which claims the benefit of U.S. Patent Application No. 60/658,462, filed Mar. 3, 2005, the entire disclosure of which is incorporated herein by reference for all purposes.

COPYRIGHT NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND OF THE INVENTION

The present invention relates generally to image rendering (transforming three-dimensional (3-D) objects into a two-dimensional (2-D) image), and more particularly to techniques for aiding users in lighting design, as for example in computer cinematography.

In computer-animated films, the process of lighting design involves placing and configuring lights to define the visual appearance of environments and to enhance story elements. This process is labor intensive and time consuming; for example, one recent computer-animated feature, Pixar's "The Incredibles," required a crew of 40 lighting artists.

Geometric complexity poses an increasing challenge to relighting systems (sometimes referred to in the literature as relighting engines). Geometric complexity has grown dramatically in recent years, and this trend is expected to continue. In typical production scenes, geometric complexity arises from the number of objects visible in a given shot as well as from the use of high quality surfaces to represent each of these objects. Main characters contain thousands of surfaces, and some include millions of curves representing hair or fur. Indoor environments commonly have tens of thousands of visible objects modeled using subdivision surfaces and NURBS (often in excessive detail), and outdoor environments usually have even higher complexity since they commonly feature millions of leaves or blades of grass. Depth complexity is another aspect of geometric complexity that poses a considerable challenge to relighting systems. Anywhere between 20 and 1000 depth samples are common in final rendering; translucent hair increases depth complexity considerably.

Shader execution dominates render time in shots without raytracing. This high computational cost is due to several factors. First, separate surface shaders are usually written for each object in a scene, resulting in hundreds or even thousands of unique shaders. These shaders can contain over 100,000 instructions and access several gigabytes of textures in a single scene.

Table 1 below shows some measures of scene complexity and properties of surface shaders for the relatively simple scene shown in FIG. 1 and for a representative high-complexity scene from a recent film. Resolution-dependent data is for a 720×301 render.

TABLE 1

|  | Relatively simple scene (e.g., scene in FIG. 1) | Complex scene |
| --- | --- | --- |
| Higher-order primitives | 2,152 | 136,478 |
| Shaded points | 5,320,714 | 13,732,520 |
| Surface shaders | 152 | 1,312 |
| Maximum shader length | 56,601 | 180,497 |
| Average shader length | 17,268 | 16,753 |
| Average plugin calls in shader | 374 | 316 |
| Total size of textures used | 0.243 GB | 3.22 GB |
| Number of lights | 54 | 169 |
| RenderMan render time | 1:30:37 | 4:09:28 |

The design of high-quality lighting is an interactive process where the designer places lights and renders the scene in an iterative process. Unfortunately, the increases in shot complexity have not been met by similarly dramatic increases in the speed at which computer systems can render high-quality images. Therefore, the designers, who need fast and accurate feedback, are forced to choose between long render times or drastic reductions in image quality in preview renders. Typical techniques to speed up rendering include lower sampling rates, stand-in models, and simplified surface shaders.

Most lighting tasks begin with blocking, in which lights are initially placed and parameters are coarsely adjusted to achieve the desired appearance. In this exploratory phase, small approximations to the final image can be tolerated in exchange for the convenience of interactivity. Blocking is followed by refinement, which is characterized by small changes in the parameters of each light (often just the intensity and position). Feedback during refinement must be highly accurate so that decisions can be finalized. Poor feedback during the design can lead to significant inefficiencies where and less-than-acceptable results only appear after final rendering, necessitating additional design and further time-consuming rendering. Consumers have come to expect nothing but the best, and so allowing not-quite-right scenes to appear in the final product is generally not an acceptable alternative.

Thus, it can be seen that the sheer complexity of scenes in current productions, which includes geometric, surface shader, and light shader complexity, presents an extremely high hurdle for the lighting designer who would benefit from interactive feedback during lighting.

BRIEF SUMMARY OF THE INVENTION

In short, embodiments of the present invention provide techniques that enable interactive relighting, even for complex scenes including large numbers of objects and/or objects with complex surface shading. An interactive relighting system according to some embodiments is sometimes referred to as the "lpics system" where "lpics" is a shorthand form of "lighting pictures."

In one aspect of the invention, a relighting system makes use of image-space caches, which contain the parameter values for an illumination model. The use of image-space caches exploits a recognition that image resolution is likely to grow at a much slower pace than scene complexity. The relighting system's image-space caches can be independent of scene complexity, which, as mentioned above, continues to grow as consumers have come to expect increasingly realistic and intricate rendered images.

In another aspect of the invention, during a lighting session, light shaders are individually executed on a graphics processor (GPU) using the data contained in the image-space caches. A light is re-executed only when its parameters change, permitting scenes with hundreds of lights to be re-rendered at interactive rates.

In another aspect of the invention, light shaders are simplified and translated into a hardware shading language (such as Cg). Currently this simplification is performed manually, incorporating sampling approximations (using fewer samples) and interpolation approximations (lower order) to speed up rendering.

Methods and systems according to embodiments of the invention provide images of an illuminated scene where a set of computer-generated lights (characterized by a set of source parameters) illuminate a set of computer-generated objects (characterized by a set of object parameters). The methods include either or both of a first phase, or a second phase. The first phase may be, and is typically, done off-line. It is sometimes referred to as the batch render or the off-line render. The second phase is sometimes referred to as the runtime or interactive phase. Since the two phases are typically done at different times and different locations, each phase represents a commercially and technically viable subcombination.

In one aspect of the invention, a method includes executing a set of surface shaders on the objects to generate a set of surface response caches, each surface response cache storing values for a respective object parameter for each of a plurality of pixel locations in an image plane, the values being determined independent of the light sources.

In another aspect, the surface response caches are used in a method that includes:
  for each of a plurality of the light sources having respective sets of source parameter values, executing a light shader for that light source in a graphics processing unit (GPU), with the surface response caches as inputs, to determine a light contribution for that light source's interaction with the objects, and caching the light contributions;
  in the GPU, combining the cached light contributions for the plurality of light sources to provide composite lighting information representing the interaction of the plurality of light sources with the objects;
  displaying the composite lighting information in the form of an image depicting the illuminated objects; and
  in response to receiving user input signifying one or more changed source parameter values for a given light source, in the GPU, re-executing the light shader for the given light source to modify the composite lighting information in substantially real time, and displaying the composite lighting information, so modified, in the form of a revised image depicting the illuminated objects with the changed source parameter values.

In another aspect of the invention, a method includes:
  for at least one camera view characterized by a set of camera view parameter values, establishing an image plane for that camera view, the image plane being subdivided into pixels,
  performing a set of shading operations for the objects to generate surface parameter values for the objects,
  determining, for each pixel, values that represent the object parameter values for surface portions of one or more objects projected to that pixel, and
  storing, for each pixel, respective values for each of the object parameters, the stored pixel values being referred to collectively as the stored object representation.

In another aspect, the stored object representation is used in a method that includes:
  (a) for each of a plurality of the light sources having respective sets of source parameter values, in a graphics processing unit (GPU), generating information representing the interaction of that light source with the stored object representation, and caching the information representing the interaction of that light source with the stored object representation;
  in the GPU, combining the cached information for the plurality of light sources to provide composite lighting information representing the interaction of the plurality of light sources with the stored object representation for the particular sets of values for the light sources' source parameters;
  displaying the composite lighting information in the form of an image depicting the illuminated objects; and
  in response to receiving user input signifying one or more changed source parameter values for a given light source, modifying, in substantially real time, the composite lighting information to account for the changed source parameter values, and displaying the composite lighting information, so modified, in the form of a modified image depicting the illuminated objects with the changed source parameter values.

In another aspect of the invention, a method includes:
  performing a set of shading operations to generate surface parameter values for the objects, and
  storing object information that includes object parameter values for at least one of the objects to be lighted as viewed from a view point, the stored object information being independent of the light sources, wherein the stored object information is substantially independent of geometric complexity and surface shading complexity.

In another aspect, the object information is used in a method that includes:
  for each of a plurality of the light sources having respective sets of source parameter values, in a graphics processing unit (GPU), generating information representing the interaction of that light source with the stored object information, and caching the information representing the interaction of that light source with the stored object information;
  in the GPU, combining the cached information for the plurality of light sources to provide composite lighting information representing the interaction of the plurality of light sources with the stored object information for the particular sets of values for the light sources' source parameters;
  displaying the composite lighting information in the form of an image depicting the illuminated objects;
  in response to receiving user input signifying one or more changed source parameter values for a given light source, in the GPU, generating, in substantially real time, modified information for the interaction of the given light source with the illumination model in view of the one or more changed values, modifying the composite lighting information to account for the changed source parameter values, and replacing previously cached information for the given light source with the modified information in substantially real time; and
  displaying the composite lighting information, so modified, to provide an updated image depicting the illuminated objects in view of the one or more changed source parameter values;
  wherein the interaction of the plurality of light sources with the objects is only re-computed for those light sources that undergo one or more changed source parameter values, thereby providing real-time feedback to user input signifying changed source parameter values.

In another aspect of the invention, a system includes a processor; first, second, third, fourth, and fifth storage; a graphics processing unit ("GPU"); a display; a set of input devices coupled to the processor; and control software.

In this system, the first storage is coupled to the processor, and stores, on a pixel-by-pixel basis, a plurality of object parameter values resulting from operating surface shaders on the objects, the plurality of object parameter values representing surface response of the objects to light but being independent of lighting. The GPU is coupled to the first storage, and the display is coupled to the GPU. The second storage is coupled to the GPU and stores a set of light shaders corresponding to the set of light sources, with the light shaders being configured for operation in the GPU. The third storage is coupled to the GPU and stores results of the light shaders operating on the object parameter values. The fourth storage is coupled to the GPU and stores source parameter values for the light sources. The fifth storage is coupled to the processor and stores programming constructs that respond to signals from the input devices by modifying values of source parameters for the light sources.

Under the control software the GPU executes the light shaders on the object parameter values from the first storage and the source parameter values from the fourth storage to provide individual light contributions. The GPU caches the individual light contributions in the fourth storage and combines the individual light contributions to provide composite lighting information. The control software responds to changes in values of source parameters for given light sources and causes the GPU to modify, in substantially real time, the composite lighting information to account for the changed source parameter values by re-executing only those light shaders corresponding to light sources whose parameter values had changed. The GPU formats data for displaying the composite lighting information, so modified, in the form of an image depicting the illuminated objects with the changed source parameter values.

In another aspect of the invention, a system includes: means for storing, for each pixel in an image plane, respective values for each of the object parameters, the stored pixel values being generated by performing a set of shading operations for the objects to generate surface parameter values for the objects, the stored pixel values being referred to collectively as the stored object representation, wherein all the pixels in the stored object representation have the same number of object parameters; and a graphics processing unit (GPU).

In this system, the GPU includes: means for generating, for each of a plurality of the light sources having respective sets of source parameter values, information representing the interaction of each light source with the stored object representation; means for caching the information representing the interaction of that light source with the stored object representation; means for combining the cached information for the plurality of light sources to provide composite lighting information representing the interaction of the plurality of light sources with the stored object representation for the particular sets of values for the light sources' source parameters; means for displaying the composite lighting information in the form of an image depicting the illuminated objects; and means, responsive to receiving user input signifying one or more changed source parameter values for a given light source, (a) for modifying, in substantially real time, the composite lighting information to account for the changed source parameter values; and (b) for displaying the composite lighting information, so modified, in the form of a revised image depicting the illuminated objects with the changed source parameter values.

A further understanding of the nature and advantages of the present invention may be realized by reference to the remaining portions of the specification and the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Introduction

Figure 1:
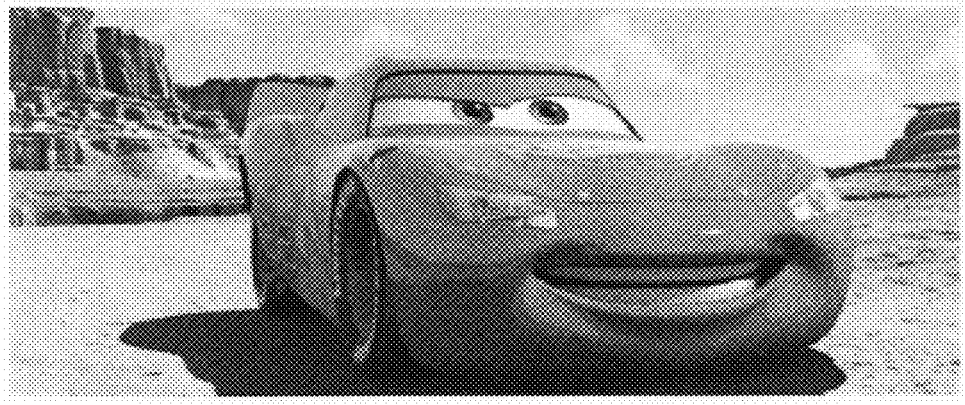
FIG. 1 is a fully rendered image of a relatively simple scene.

Embodiments of the present invention provide lighting designers with an interactive tool of adequate fidelity for most blocking and many refinement tasks. A relighting system according to embodiments of the present invention provides lighting artists with high-quality previews at interactive framerates with only small approximations compared to the final rendered images. In some cases the quality of feedback is high enough to permit final shot lighting without resorting to conventional software rendering. In an exemplary embodiment, a cache-generating shader is executed by a conventional software renderer, followed by a cache-reading shader executed on the GPU. In this embodiment, light shaders are manually translated to a hardware shading language, and the results computed by lights are combined by a fixed general-purpose illumination model.

Shading Overview

This application sometimes refers to RenderMan® shaders and RenderMan software. RenderMan, which is a registered trademark of Pixar (Emeryville, Calif.), is the name of a rendering software package available from Pixar, and also specifies a widely used interface, also created by Pixar, that stands between modeling programs and rendering programs. The RenderMan Interface is a three-dimensional scene description interface, and is used for describing three-dimensional scenes in a manner suitable for photorealistic image synthesis. Version 3.2 of the interface specification was issued July 2000, and Version 3.2.1 (November 2005) is available for download at https_://_renderman.pixar.com_/products/rispec/index.htm (underscores in the URL are inserted to prevent the URL from being loaded).

The RenderMan environment also provides the RenderMan Shading Language, which is a programming language designed to be used with the RenderMan Interface and to extend its predefined functionality. Shading includes the entire process of computing the color of a point on a surface or at a pixel. The shading process requires the specification of light sources, surface material properties, volume or atmospheric effects, and pixel operations. Each part of the shading process is controlled by giving a function that mathematically describes that part of the shading process.

The term shader refers to a procedure that implements one of these processes, and the specification sets forth the following five major types of shaders:

Light source shaders. Lights may exist alone or be attached to geometric primitives. A light source shader calculates the color of the light emitted from a point on the light source towards a point on the surface being illuminated. A light will typically have a color or spectrum, an intensity, a directional dependency and a fall-off with distance.

Surface shaders are attached to all geometric primitives and are used to model the optical properties of materials from which the primitive was constructed. A surface shader computes the light reflected in a particular direction by summing over the incoming light and considering the properties of the surface.

Volume shaders modulate the color of a light ray as it travels through a volume. Volumes are defined as the insides of solid objects. The atmosphere is the initial volume defined before any objects are created.

Displacement shaders change the position and normals of points on the surface, in order to place bumps on surfaces.

Imager shaders are used to program pixel operations that are done before the image is quantized and output.

Table 2 below sets forth the standard shaders defined by the RenderMan Interface.

TABLE 2

| Type | Shader(s) |
| --- | --- |
| Light sources | ambientlight, distantlight, pointlight, spotlight |
| Surfaces | constant, matte, metal, shinymetal, plastic, paintedplastic |
| Volume (atmosphere) | fog, depthcue |
| Displacement | bumpy |
| Imager | background |

System Overview

Figure 2:
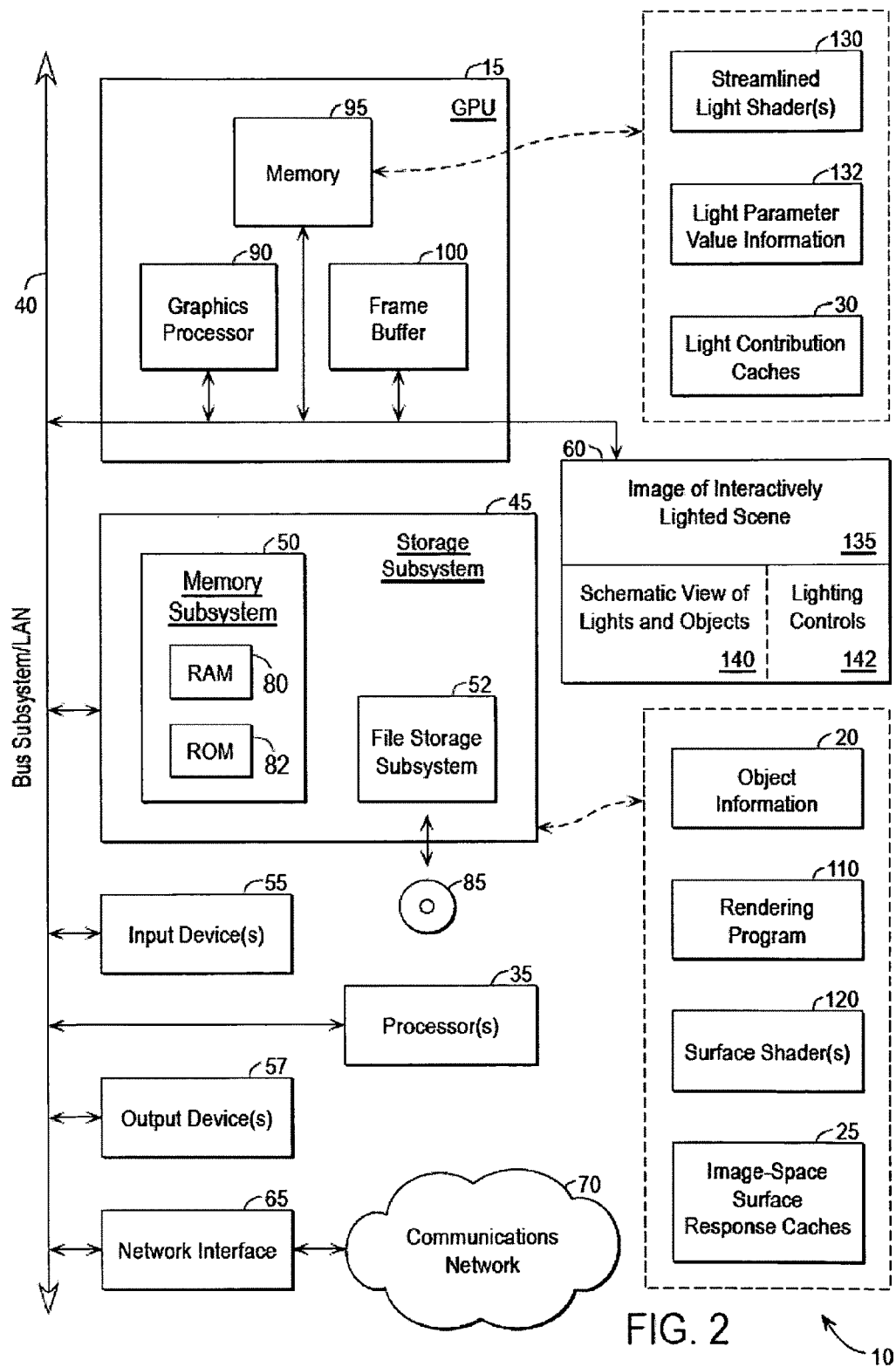
FIG. 2 is a high-level schematic of an interactive relighting system incorporating an embodiment of the present invention.

FIG. 2 is a high-level schematic of an interactive relighting system 10 incorporating an embodiment of the present invention. At a high level, the system can be considered to include the elements of a general purpose computer system, augmented by a specialized graphics processing unit (GPU) 15. As will be discussed in detail below, the illustrated general purpose computer, or another computer, is used in an initial phase to generate and store a representation of shaded objects, characterized by object information 20, in the form of image-space surface response caches 25 (also sometimes referred to as "lpics caches"), which are used by GPU 15 in a subsequent interactive relighting phase ("runtime phase") to compute and cache the contributions 30 of each light. The illustrated general purpose computer is also used to provide a computing environment for GPU 15.

The general purpose computer in relighting system 10 typically includes at least one processor 35, which communicates with a number of peripheral devices (including GPU 15) via a bus subsystem 40. These peripheral devices typically include a storage subsystem 45, comprising a memory subsystem 50 and a file storage subsystem 52, user interface input devices 55, user interface output devices 57, a separately denoted display 60 (which may comprise multiple displays), and a network interface subsystem 65.

Bus subsystem 40 provides a mechanism by which the various components and subsystems of computer system 10 communicate with each other to effect the intended operations. The various subsystems and components of relighting system 10 need not be at the same physical location but may be distributed at various locations on a local area network (LAN). Although bus subsystem 40 is shown schematically as a single bus, embodiments of the bus subsystem may utilize multiple buses.

The input and output devices allow user interaction with relighting system 10. Although the user of the interactive relighting system is contemplated to be a human user, some of the input and output devices may be suitable for interaction with other than a human user (e.g., a device, a process, another computer). Network interface subsystem 65 provides an interface to one or more networks, including an interface to a communications network 70, and is connected via such networks to corresponding interface devices in other computer systems. The network interface may include, for example, a modem, an Integrated Digital Services Network (ISDN) device, an Asynchronous Transfer Mode (ATM) device, a Direct Subscriber Line (DSL) device, a fiber optic device, an Ethernet card, a cable TV device, or a wireless device. The networks may be local area networks, wide area networks, or a collection of networks such as the internet.

Input devices 55 may include a keyboard, pointing devices such as a mouse, trackball, touchpad, or graphics tablet, a scanner, a barcode scanner, a touchscreen incorporated into display 60, audio input devices such as voice recognition systems, microphones, and other types of input devices. In general, use of the term "input device" is intended to include all possible types of devices and ways to input information into relighting system 10 or onto communications network 65.

Output devices 57 may include one or more printers, fax machines, or non-visual displays such as audio output devices. Display 60 may be a cathode ray tube (CRT), a flat-panel device such as a liquid crystal display (LCD) or a plasma display, or a projection device. In general, use of the term "output device" is intended to include all possible types of devices and ways to output information from relighting system 10 to a user or to another machine or computer system.

Storage subsystem 45 stores the basic programming and data constructs that provide the functionality of the relighting system. For example, the various program modules and databases implementing the functionality of the present invention may be stored in storage subsystem 45. These software modules are generally executed by processor(s) 35, although as will be described below, some software is executed by GPU 15. In a distributed environment, the software modules may be stored on a plurality of computer systems and executed by processors of the plurality of computer systems.

Memory subsystem 50 typically includes a number of memories including a main random access memory (RAM) 80 for storage of instructions and data during program execution and a read only memory (ROM) 82 in which fixed instructions are stored. File storage subsystem 52 provides persistent (non-volatile) storage for program and data files, and may include one or more hard disk drives and one or more drives for reading and writing removable media, typically along with their associated removable media (shown symbolically as a disk 85). Removable media include, for example, removable magnetic media (e.g., floppy disks, or larger capacity flexible or rigid media such as those marketed under the ZIP and REV registered trademarks by Iomega Corporation), and optical media (e.g., CD-ROM, CD-R, CD-RW, DVD-ROM, DVD-RAM, DVD-R, DVD-RW). One or more of the drives may be located at remote locations on other connected computers on the LAN or at another site on communications network 70, and may be shared by multiple computers.

The general purpose computer incorporated in relighting system 10 can be of any type capable of performing the functions in an acceptable manner. Examples of such possible computers include a personal computer (desktop or laptop), a workstation, a computer terminal, a network computer, a mainframe, or any other data processing system. Due to the ever-changing nature of computers and networks, the description of the computer system depicted in FIG. 2 is intended only as a specific example for purposes of illustrating a representative configuration. In a specific implementation, processors 25 included dual 3.4 GHz Intel® Xeon® processors with 4 GB of RAM.

GPU 15 includes a graphics processor 90, a memory subsystem 95, and one or more frame buffers 100. Graphics processor 90 is specially configured for extremely fast 3-D graphics processing operations. GPUs are available from a number of manufacturers, including NVIDIA and ATI. In a specific implementation, GPU 15 included an NVIDIA® Quadro® FX 4400 PCI Express graphics card.

Some of the salient features of relighting system 10 reside in the programs and data structures shown in storage subsystem 45 and GPU memory 95. As mentioned above in the Introduction section above, (1) a cache-generating shader is executed by a conventional software renderer, and (2) a cache-reading shader is executed on the GPU. Item (1) is represented at a high level by showing storage subsystem 45 as storing object information 20, a rendering program 110 (e.g., the RenderMan® program available from Pixar (Emeryville, Calif.), and surface shaders 110, which together are used to generate image-space surface response caches (lpics caches) 25. These caches store surface geometry and associated parameters that serve as inputs to the illumination model. Item (2) is represented at a similar high level by showing GPU memory 95 as storing streamlined light shaders 130 (with associated lighting parameter values 132) for the individual lights. These shaders when executed by graphics processor 90, using the data stored in caches 25 as operands, generate results for each light's contribution to the overall lighting, which are stored as light contribution caches 30.

Additionally, display 60 is shown, in an exemplary embodiment, as displaying three distinct regions, an image of an interactively lighted scene 135, a schematic view of the lights and objects 140, and a set of light controls (control panel) to allow the user to specify values for the lighting parameters 142. It will be understood that the schematic view of the lights and the control panel are merely one example of a set of tools for the user. While a graphical user interface is generally preferred, the system could include a command-line interface as well as, or instead of, the graphical interface.

Figure 3A:
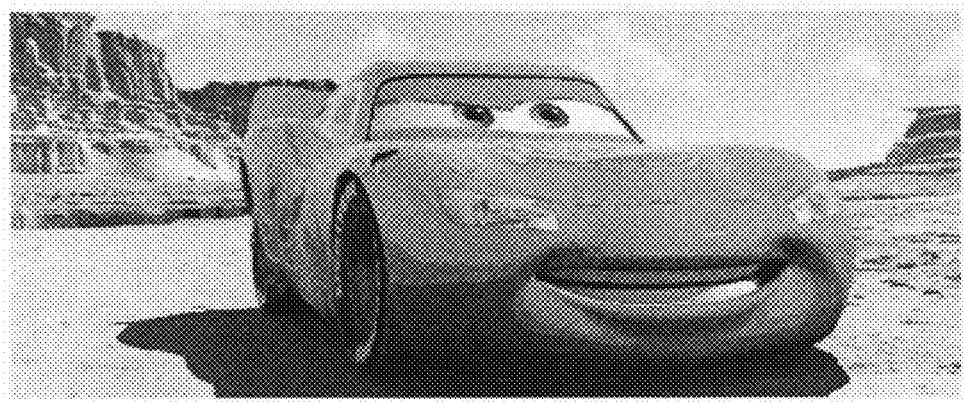
FIG. 3A is an image interactively rendered in accordance with an embodiment of the present invention.
Figure 3B:
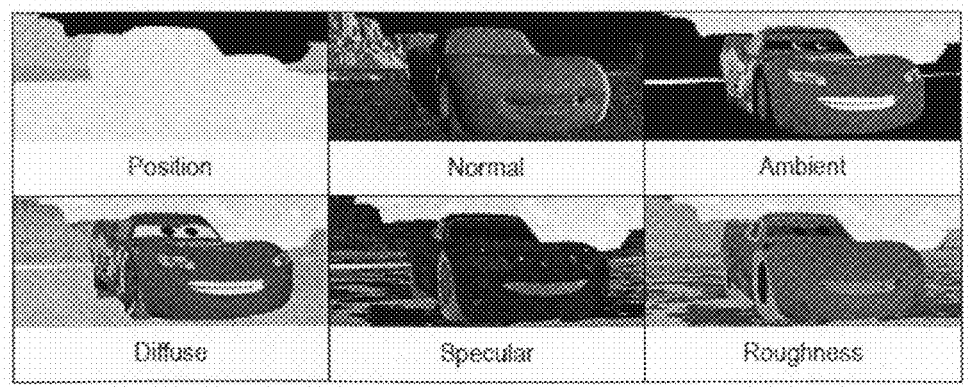
FIG. 3B shows representative image-space surface response caches used for the image shown in FIG. 3A.

FIG. 3A shows a representative image produced by relighting system 10 when operating on a scene with objects corresponding to those in the scene of FIG. 1. This image is what might be image 135 mentioned above. FIG. 3B shows representative image-space surface response caches used for the image shown in FIG. 3A. The cache images contain information about the scene independent of the lighting calculations. The values are approximate, intermediate results of a partially evaluated surface shader, independent of lighting. The exact nature of those values is dependent upon the lighting model in use by a production. Since the cache images represent numerical values of parameters such as geometric values, the colors in the illustrated images are merely an aid to visualization, and generally have no physical meaning.

While a specific embodiment uses the same illumination model for all the objects in the scene, the invention does not require this. When the same illumination model is used for all the objects, each of the pixels has the same set of object parameters. This can be computationally more efficient, but where the objects in the scene are characterized with more than one illumination model, it may be desirable to use separate sets of caches with each set consisting of the surface parameters used in the respective illumination model. One can then execute the light shaders for each set of caches and combine the final results.

Operation of Embodiments

Figure 4:
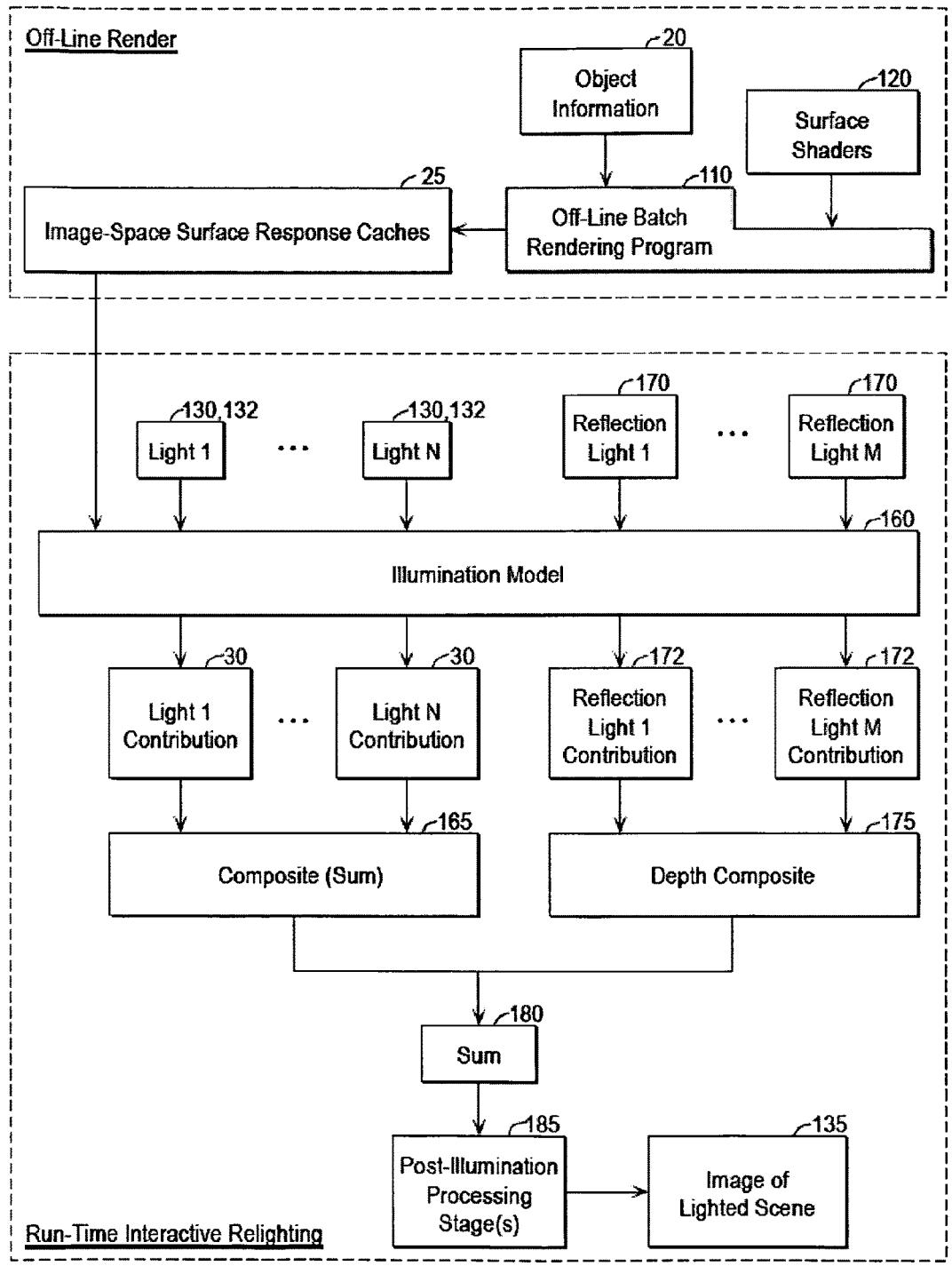
FIGS. 4 and 5 are schematics showing the overall operation, including data and control flows, of the system of FIG. 1.
Figure 5:
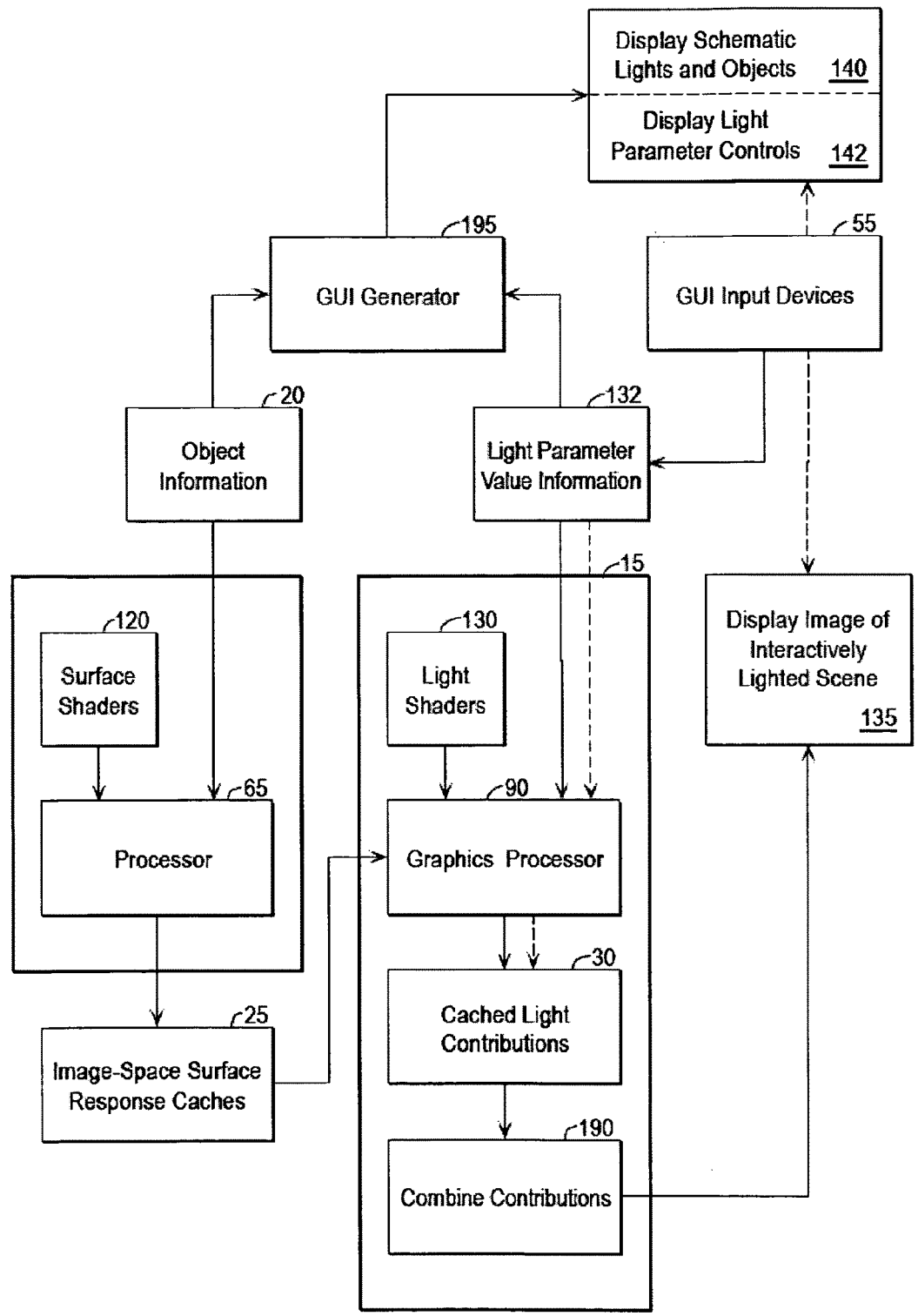

FIGS. 4 and 5 are schematics showing the overall operation of the system of FIG. 2 in accordance with an embodiment of the present invention. FIG. 4 is drawn from the point of view of the data flows and computation while FIG. 5 places particular emphasis on the interactive nature of the operation. In brief, the upper left portion of FIG. 4 shows the generation of image-space surface response caches 25, which are independent of the lights, while the remaining portions of the figure show, among other things, the lighting operations in which light shaders 130 (with their associated parameter values 132) for the individual lights are used to compute the respective contributions 30 to overall illumination (referred to as "light contributions"). FIG. 5 shows how the system caches light contributions 130, and updates the displayed image in response to changes in values of one of the lights' parameters.

As alluded to above and as will be discussed in greater detail below, embodiments of the present invention is able to re-render scenes with very high geometric and shading complexity in response to specified lighting changes at interactive framerates with minimal image approximations. In specific embodiments, geometric complexity is addressed by a batch render that caches per-pixel positions, normals, and other parameters in deep framebuffers (lpics caches 25, which are independent of lights). In specific embodiments, surface shader complexity is addressed by adopting an illumination model with parameters that are numerically estimated from data cached by the original surface shaders in other deep framebuffers. In specific embodiments, lighting complexity is dealt with by simplifying the light shaders and translating light shaders to a hardware shading language for execution in GPU 15. Light shaders are also specialized to eliminate unnecessary and redundant calculations.

Illumination Model

Pattern generation is the most resource-intensive part of surface shader execution, while the evaluation of illumination is dominated by the cost of light shaders. The surface response to lighting is encoded in a function queried by the light shader at a given point based on parameters computed during pattern generation. The term "illumination model" will be used to describe this function, which is similar in spirit to the bidirectional reflectance distribution function (BRDF). However, while the BRDF is a four-dimensional function, our illumination model is higher dimensional and can vary based on the number of parameters passed between the light and surface shaders. The illumination model is denoted with the reference number 160. While the illumination model is shown as a discrete block for simplicity, it should be realized that other portions of the system are configured in view of the illumination model. For example, the various manners in which light contributions are composited are technically part of the illumination model. In a specific production environment, there are a handful of illumination models, and they are implemented by code in shared libraries.

RenderMan surface and light shaders permit the expression of arbitrary illumination models. However, Pixar productions typically use only one or two very general ones, just as many different materials can be described by a handful of analytic BRDF models. Our illumination models require positions and normals as well as analogues of diffuse, specular, and reflection color, along with additional parameters that modify the surface response. These parameters are only roughly analogous to their physical BRDF equivalents; for example, the component responsible for diffuse-like behavior is view dependent in our model.

The objects to be rendered will normally have been generated by a suitable 3-D modeling program; the specifics of the generation of the objects are not a part of the invention and will not be described further. The surface shading of the objects characterized by object information 20 is effected by rendering program 110 in conjunction with surface shaders 120, as will be described in detail below. Light contributions 30 are computed in GPU 15 by providing the values stored in lpics caches 25 as the inputs to the GPU. In a particular implementation, illumination model 160 is characterized by 12 parameters (dimensions), and each pixel in the lpics caches is represented by the values for these parameters.

Surface Shading and Lpics Caches 25

Although there are many unique surface shaders, they all tend to have the same structure, based on overlaying a series of basic layers of illumination, each of which is composed of a pattern generation part and an illumination computation. Examples of this use of layered illumination are materials such as rust on paint, dirt on wood, etc. Surface shaders 120 are instrumented to cache data that will subsequently be read by light shaders. These lpics caches 25 are essentially deep framebuffers that record all the parameters that contribute to illumination model 160. As mentioned above, the lpics caches for the scene in FIG. 1 are shown in FIG. 3B.

To cope with surface shader complexity, lpics caches 25 store the results of pattern generation, which are independent of lights. The exemplary illumination models employ a linear combination of their parameters (e.g., the diffuse, specular, and reflection components) using sums and over operators. This allows us to accurately estimate combined illumination after executing light shaders. This is shown schematically in FIG. 4 as light contributions 30 being composited by summation (block 165).

Table 3 below shows pseudocode illustrating the typical organization of shading code for a layered surface shader and its approximation in the lpics system.

TABLE 3

```
surface RendermanLayeredSurface(...) {
  for all layers 1 {
    illumParams[1] = GeneratePatterns(1,...);
    Ci += ComputeIllumination(illumParams[1]);
} }
surface LpicsApproximation(...) {
  // Preprocess begins here
  for all layers 1 {
    illumParams[1] = GeneratePatterns(1,...); } combinedIllumParams =
    CombineLayerParameters(illumParams); // Preprocess ends here
  // This is computed in hardware
Ci = ComputeIllumination(combinedIllumParams); }
```

Interactive rendering system 10 is mostly agnostic about the contents of lpics caches 25, requiring only position information for raytraced shadow evaluation. This allows the system to serve multiple productions simultaneously despite their use of different cached data. More importantly, this allows production artists to change the illumination model and lighting model arbitrarily. For example, raytraced reflections, new illumination models, more layers of illumination, and additional layers of transparency can all be handled by simply adding lpics layers. That is, a scene can be split into multiple layers, say a background layer, and a foreground layer containing the characters. A set of lpics caches would be rendered for both the background and the foreground for use at runtime.

A drawback of deep framebuffer approaches is that they trade shading throughput for higher latency in camera movement, a tradeoff often acceptable for lighting purposes, in which the camera position is not adjusted interactively. Nevertheless, a current implementation of the relighting system supports multiple camera views by rendering different caches, a technique that is also used to provide high-quality animation previews. Support for transparency can be provided by multiple sets of lpics caches that are generated using a technique similar to depth peeling [Everitt 2001].

Light Shading

Lighting complexity has remained a major obstacle to interactivity, an obstacle largely overcome by the present invention. Lighting complexity results from the number of lights, which is routinely in the hundreds in our production shots, as well as the complexity of the light shaders, which typically contain over 10,000 high level instructions. Shadows are a major contributor to light shading complexity, and can be implemented either by shadow mapping, deep shadow mapping [Lokovic and Veach 2000], or raytraced soft shadowing. This will be discussed in the section below under the heading "Interactive Shadows."

In a specific embodiment, the lighting model is an extended version of the one presented in [Barzel 1997]. This lighting model is mostly a direct illumination model with control over many parameters including light intensity, color, and shadow. These controls are arranged in different components that can be enabled or disabled on each light; examples of such components are shadows, shape and color specifications, falloff, and a variety of other effects.

While our lighting model is primarily based on direct illumination, certain non-local effects are supported using either environment mapping or raytracing, including reflections, ambient occlusion, raytraced shadows and irradiance. An approximated global illumination solution similar to [Tabellion and Lamorlette 2004] is also available but used infrequently due to its high computational complexity.

The lpics system loads lpics caches 25 and transfers them as needed to the GPU as textures. The contribution of each light is then calculated in turn by drawing a screen-aligned quad shaded using a respective light shader 130 whose surface operand parameters are the lpics caches, along with user-specified light parameters 132. This is shown schematically in FIG. 4 as light shaders 130 (with associated light parameters 132) and lpics caches 25 being input to illumination model 160, thereby resulting in the generation of respective light contributions 30. These light contributions are summed, as shown by block 165.

However, the accumulation into the final image is more complicated, since a set of one or more reflection lights 170 give rise to contributions 172 that need to be depth composited (Z-composited) at a block 175, and the result summed with the sum of light contributions 30 as shown by a summing block 180. The result is then subjected to post-illumination processing stages 185 before being displayed as lighted image 135. In a situation where additional lpics layers were generated for use at runtime, these separate lpics layers (e.g., background and the foreground) would processed separately and then the resulting images would be composited.

FIG. 5 shows two aspects of the interactive relighting, the caching mechanism that contributes to the interactive framerates on relighting, and the GUI interface. In short, the result of each light is cached and updated only if its parameters are interactively modified. Graphics processor receives the data stored in lpics caches 25 as input data, and executes light shaders 130. The result, shown by solid flow arrows, is that light contributions 30 are cached. As a portion of light parameter value information 132 is modified as a result of the user interacting with the lights, the contribution for the changed light or lights is recomputed. The contributions are combined (block 190, subsuming for example, blocks 165, 175, and 180 in FIG. 4) to provide the image of the lighted scene with the changed light parameter value(s).

In this embodiment, a GUI generator 195 uses object information 20 and lighting parameter value information 132 to display a wireframe or other schematic of the objects and the lights, and controllers to allow the user to actuate input devices 55 to manipulate the light parameter values. Thus, the user may interact with controls in the displayed control panel or may interact with the displayed schematic view of the lights, as for example by dragging to translate and/or rotate the lights. This interaction is represented schematically by a dashed arrow from the input device block to the block with the controllers (140) and the schematic of the objects and the lights (142). The changed light parameter information and resultant light contribution are shown by dashed flow arrows. Since the user is only able to modify a relatively small number of lights at a time, the fact that there may be hundreds of lights does not interfere with the relighting being rendered in real time.

A further aspect of the user interface is to allow the user to directly manipulate shadows, reflections, and highlights in a manner similar to [Pellacini et al. 2002; Gleicher and Witkin 1992], rather than forcing the user to indirectly achieve desired results by manipulating the lighting controls to change the source parameters. This has proved invaluable to lighting designers, since art direction often imposes precise demands on the placement of highlights and reflections. Without the interactivity provided by the invention, such direct manipulation of shadows, reflections, and highlights would be of less value. This aspect of the user interface is represented schematically by a dashed arrow from the input device block to the block displaying the image of the lighted scene (135).

Since executing light shaders is typically the most time-consuming operation, the light shaders were optimized in a number of ways to enhance their speed. First, we manually translated our production light shaders to Cg [Mark et al. 2003] for execution on the GPU. A consideration for the interactive relighting system is its integration with the other parts of our production pipeline. Thus, it is highly preferable that light shader parameters be identical to permit integration with existing tools, allowing the interactive renderer to offer the same user controls as our standard modeling and animation system. To this end, the Cg light shaders have the same structure as their RenderMan counterparts, except that they also include the evaluation of the illumination model.

The Cg shaders also incorporate simplifications that were carefully chosen to balance speed and image quality. Furthermore, the lighting model should be as arbitrary as possible to permit customization by production artists. In the domain of blocking tasks (e.g., the initial placement and configuration of lights), correct light shaping and falloff, a good approximation of surface response to lights, and accurate positioning of shadows and reflections could be considered essential features. On the other hand, features such as accurate antialiasing, motion blur, correctly blurred shadows and reflections are found to be useful but not necessary. Therefore, common areas of simplification were simplified antialiasing, filtering, and interpolation primitives. While this approach might seem time consuming, our productions typically use only a handful of custom light shaders. We briefly investigated techniques for automated translation of RenderMan shaders to Cg but quickly realized its futility in the absence of automated shader simplification.

Table 4 below sets forth properties of typical lpics GPU light shaders, after specialization. The corresponding non-specialized RenderMan shader contains about 10,000 high-level instructions. Textures exclude input lpics caches. As illustrated in Table 4, even fairly simple lights have a large number of instructions, registers, and other resources.

TABLE 4

|              | Simple | Average | Heavy | Upper bound |
|--------------|--------|---------|-------|-------------|
| Components   | 8      | 15      | 42    | 58          |
| Instructions | 1045   | 1558    | 3661  | 5220        |
| Registers    | 12     | 16      | 18    | 20          |
| Textures     | 3      | 5       | 13    | 22          |

Since our lighting code allows lights to have arbitrary numbers of components that control shaping, falloff, shadows, etc., a simple kind of program specialization [Jones et al. 1993] was effected and proved important. Each light shader is constructed with a macro preprocessor to contain only the code necessary to compute the components present in that light. This is an especially important optimization on graphics hardware where true branching is not supported and function calls are always inlined. For hardware that supports branching instructions, this optimization continues to be useful due to branching overhead and limits on uniform input parameters. Additionally, we have experimented with the program specialization capabilities in the Cg compiler and realized 10-15% speed improvements, which was too small to justify deployment.

In some cases these shaders cannot be executed in a single pass due to resource limitations; in these cases, the lpics system disables light components that are deemed to have low priority. While resource virtualization was impractical at the time the system was deployed, advances in hardware architectures and new algorithms for resource virtualization [Riffel et al. 2004] should soon address this issue.

Interactive Shadows

When computing the lighting at each sample, shadow information might be needed. The lpics system supports shadow queries using either shadow mapping or raytracing. For shadow mapping the interactive renderer simply uses the same shadow setup as a conventional RenderMan renderer, but it rasterizes geometry using the GPU. Interactivity is achieved by using a coarse tessellation for the geometry as well as implementing various culling optimizations. In our experience, this solution works well for our productions. The only effect that could not be achieved interactively was accurate percentage closer filtering [Reeves et al. 1987], which in our scenes often requires high sampling rates (roughly 100 samples per query); the solution was simply to use built-in hardware shadow mapping, thus falling back on hard shadowing. Improved conditional execution in GPUs will allow us to support this feature in the near future.

For raytraced shadows, the lpics system integrates an interactive raytracer that for each lpics layer generates an image of the result of the shadow query. The results are then bound to the light shaders as an input texture. Due to its cost, raytraced shadowing is implemented as an asynchronous thread in a manner similar to [Tole et al. 2002]. From the user's perspective, raytraced shadows briefly disappear while the user repositions a light, and progressively reappear when the new light position is established. As mentioned above, the system allows shadows, reflections, and highlights to be directly manipulated.

Other raytrace-based effects, such as reflections, ambient occlusion, and irradiance, are not computed interactively; their results are pre-generated and cached in screen space using the offline renderer and then read in as textures in the hardware shaders. These effects are so expensive to compute that this process mimics the workflow that artists employ even when using the offline renderer. Raytraced reflections can also be supported in the lpics system by caching the illumination model parameters of each ray query in a new lpics layer.

Performance and Specific Implementation

Figure 6:
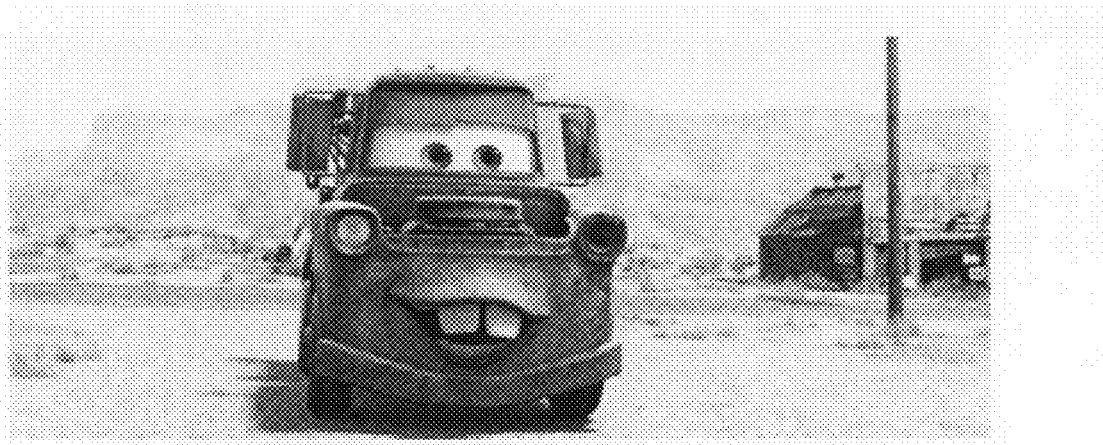
FIGS. 6, 7A, and 7B conceptually correspond to FIGS. 1, 3A and 3B, but for a different scene.
Figure 7A:
Figure 7B:
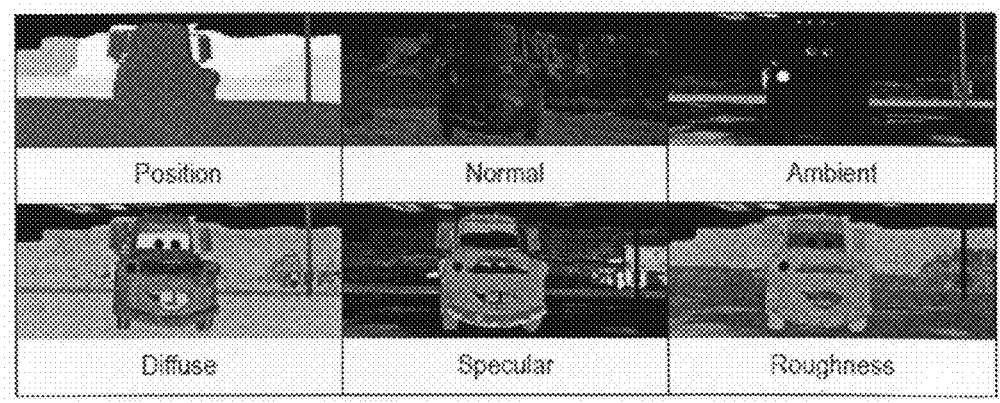

FIGS. 1 and 6 show images generated by a conventional batch renderer, RenderMan [Pix 2000], while FIGS. 3A and 7A show images of the corresponding scenes rendered interactively by the lpics system (FIG. 7B shows the lpics caches used for the image of FIG. 7A). These scenes are typical of our production shots, with complex geometry, detailed surface shading and lighting. The images reveal slight differences that are typical of images rendered by the lpics system; in particular sampling and filtering differences are common, since RenderMan textures and shadows are filtered with far more samples than are used in the lpics system.

On typical production shots, the lpics system reduces render times by four to six orders of magnitude, from over 2 hours to 10 frames per second at video resolution (720×301). The main design goal of our system was to guarantee framerate with minor loss of image fidelity. This goal made our system capable of supporting blocking tasks and allowed the integration of new user interface paradigms. While the original design was geared towards fast blocking, the image fidelity of our system was high enough to support many tasks in final lighting. In fact certain shots rendered with the present system have been approved as final with little verification using a software render. In some cases the quality of feedback is high enough to permit final shot lighting without resorting to conventional software rendering.

In typical use, relighting system 10 is run at a resolution of 720×301 on a dual 3.4 GHz Xeon with 4 GB of RAM and a Quadro FX 4400 graphics card. Framerates for production scenes range from 3 to 60 frames per second when interactively manipulating a single light. Performance varies based on the complexity of the light shaders and shadow queries. Final render times for these scenes at the same resolution take from a few hours to more than ten hours when raytracing is heavily used. Excluding shadow queries, the relighting system spends most of its time executing light shaders. This holds promise for even higher performance as graphics hardware architectures mature.

The interactive renders employ a single layer of lpics caches containing 12 parameters including position, normal, diffuse, specular and reflection coefficients, totaling 22 floating-point values. The values are packed into eight tiles of a single texture to work around a limit on texture inputs in current hardware shaders. Cache generation requires about the same amount of time as a few conventional renders, making it preferable to some data-driven relighting schemes [Ng et al. 2003].

In practice relighting system 10 is also used non-interactively to render preview sequences. While a single frame often requires a tenth of a second to re-render interactively when one light is being manipulated, a full render of the contributions of all lights with newly loaded lpics caches is often much slower. Nevertheless, a sequence of frames that takes an entire day to complete using a conventional software render on our render farm is typically rendered by relighting system 10 in a few minutes, which can deliver tremendous savings in time and machine resources.

REFERENCES

The references in the following Table 5 are hereby incorporated by reference.

TABLE 5

BARZEL, R. 1997. Lighting controls for computer cinematography. Journal of Graphics Tools 2, 1, 1-20.
BRIERE, N., AND POULIN, P. 1996. Hierarchical view-dependent structures for interactive scene manipulation,. In Computer Graphics Annual Conference Series 1996, 89-90.
COOK, R. L., CARPENTER, L., AND CATMULL, E. 1987. The Reyes image rendering architecture. In Computer Graphics (Proceedings of SIGGRAPH 87), vol. 21, 95-102.
EVERITT, C., 2001. Interactive order-independent transparency. NVIDIA White Paper.
GERSHBEIN, R., AND HANRAHAN, P. M. 2000. A fast relighting engine for interactive cinematic lighting design. In Proceedings of ACM SIGGRAPH 2000, Computer Graphics Proceedings, Annual Conference Series, 353-358.
GLEICHER, M., AND WITKIN, A. 1992. Through-the-lens camera control. In Computer Graphics (Proceedings of SIGGRAPH 92), vol. 26, 331-340.
GUENTER, B., KNOBLOCK, T. B., AND RUF, E. 1995. Specializing shaders. In Proceedings of ACM SIGGRAPH 95, Computer Graphics Proceedings, Annual Conference Series, 343-349.
HORWITZ, S., REPS, T., AND BINKLEY, D. 1990. Interprocedural slicing using dependence graphs. ACM Transactions on Programming Languages and Systems (TOPLAS) 12, 1 (January), 26-60.
JONES, N. D., GOMARD, C. K., AND SESTOFT, P. 1993. Partial Evaluation and Automatic Program Generation.
LASTRA, A., MOLNAR, S., OLANO, M., AND WANG, Y. 1995. Real-time programmable shading. In 1995 Symposium on Interactive 3D Graphics, 59-66.
LOKOVIC, T., AND VEACH, E. 2000. Deep shadow maps. In Proceedings of ACM SIGGRAPH 2000, Computer Graphics Proceedings, Annual Conference Series, 385-392.
MARK, W. R., GLANVILLE, R. S., AKELEY, K., AND KILGARD, M. J. 2003. Cg: A system for programming graphics hardware in a Clike language. ACM Transactions on Graphics 22, 3 (July), 896-907.
NG, R., RAMAMOORTHI, R., AND HANRAHAN, P. 2003. All-frequency shadows using nonlinear wavelet lighting approximation. ACM Transactions on Graphics 22, 3 (July), 376-381.
NG, R., RAMAMOORTHI, R., AND HANRAHAN, P. 2004. Triple product wavelet integrals for all frequency relighting. ACM Transactions on Graphics 23, 3 (Aug.), 477-487.
PEERCY, M. S., OLANO, M., AIREY, J., AND UNGAR, P. J. 2000. Interactive multi-pass programmable shading. In Proceedings of ACM SIGGRAPH 2000, Computer Graphics Proceedings, Annual Conference Series, 425-432.
PELLACINI, F., TOLE, P., AND GREENBERG, D. P. 2002. A user interface for interactive cinematic shadow design. ACM Transactions on Graphics 21, 3 (July), 563-566.
PIXAR. 2000. The Renderman Interface.
PIXAR. 2004. Irma Documentation.
PROUDFOOT, K., MARK, W. R., TZVETKOV, S., AND HANRAHAN, P. 2001. A real-time procedural shading system for programmable graphics hardware. In Proceedings of ACM SIGGRAPH 2001, Computer Graphics Proceedings, Annual Conference Series, 159-170.
RAGAN-KELLEY, J. M., 2004. Practical interactive lighting design for RenderMan scenes. Undergraduate thesis, Stanford University.
REEVES, W. T., SALESIN, D. H., AND COOK, R. L. 1987. Rendering antialiased shadows with depth maps. In Computer Graphics (Proceedings of SIGGRAPH 87), vol. 21, 283-291.
RIFFEL, A. T., LEFOHN, A. E., VIDIMCE, K., LEONE, M., AND OWENS, J. D. 2004. Mio: Fast multi-pass partitioning via priority-based instruction scheduling. In Graphics Hardware, 35-44.

TABLE 5-continued

SAITO, T., AND TAKAHASHI, T. 1990. Comprehensible rendering of 3D shapes. In ACM SIGGRAPH Computer Graphics, 197-206.
SEQUIN, C. H., AND SMYRL, E. K. 1989. Parameterized ray tracing. In Computer Graphics Annual Conference Series 1989, 307-314.
SLOAN, P.-P. 2002. Precomputed radiance transfer for real-time rendering in dynamic, low-frequency lighting, environments. ACM Transactions on Graphics 21, 3 (July), 477-487.
TABELLION, E., AND LAMORLETTE, A. 2004. An approximate global illumination system for computer generated films. ACM Transactions on Graphics 23, 3 (Aug.), 469-476.
TOLE, P., PELLACINI, F., WALTER, B., AND GREENBERG, D. P. 2002. Interactive global illumination in dynamic scenes. ACM Transactions on Graphics 21, 3 (July), 537-546.

Conclusion

In conclusion, it can be seen that embodiments of the present invention provide a hardware accelerated relighting system that virtually guarantees interactive feedback while lighting complex environments for computer-animated feature films.

Our system scales well with geometric, surface shading, and light shading complexity by using a deep framebuffer approach in which samples are numerically estimated and shaded on the GPU. In order to have strong framerate guarantees, our system incurs a small decrease in image fidelity which is noticeable in particular in hair geometry and soft shadowing. Even under these conditions, it is our belief that the framerate guarantees of our system completely justify the small approximations incurred.

Beyond cinematic relighting, we believe that our techniques are broadly applicable to the rendering of high-complexity environments. In particular, we think that the need to approximate shaders will become more important as shader authoring environments encourage artists to create larger shaders. Our work shows the need for two different kinds of approximation. While in the case of surface shading, our system extracts illumination parameters, thus converting the surface response to a simpler illumination model numerically, our light shaders are approximated procedurally to maintain a higher quality. We expect other shading systems using high-complexity shaders to follow our steps in introducing (possibly automatically) numerical and procedural approximations to achieve an appropriate speed-vs.-quality tradeoff. We also expect our work to foster research into new user interfaces for lighting in highly complex environments, an area that has not yet been explored for lack of an appropriate rendering solution.

While the above is a complete description of specific embodiments of the invention, the above description should not be taken as limiting the scope of the invention as defined by the claims.

What is claimed is:

1. A method performed by a computer system for generating objects for an interactive relighting system, the method comprising:
receiving a set of objects at the computer system, each of at least some of the objects being characterized by a set of object parameters including one or more geometric parameters and one or more surface parameters, a surface parameter representing the surface's response to incident illumination;
receiving an image plane at the computer system for at least one camera view characterized by a set of camera view parameters, the image plane being subdivided into pixels;
executing a set of shading operations for the objects with the computer system to generate surface parameter values for the objects as inputs to an arbitrary desired illumination model;
determining with the computer system, for each pixel of the image plane, values representing the object parameters for surface portions of one or more objects projected to that pixel; and
generating a stored object representation with the computer system based on storing, for each pixel of the image plane, the respective values representing the object parameters.

2. A computer-readable storage medium configured to store one or more software programs which when executed by a processor of the computer system cause the computer system to perform the steps recited in the method of claim 1.

3. A method performed by a data processing system for providing images of an illuminated scene characterized by a set of computer-generated objects and a set of computer-generated light sources for illuminating the objects,
each of at least some of the computer-generated objects is characterized by a set of object parameters including one or more geometric parameters and one or more surface parameters where a surface parameter represents the surface's response to incident illumination,
each of at least some of the computer-generated light sources is characterized by a set of source parameters,
the method comprising:
determining, with a first set of processors associated with the data processing system, a set of values for surface parameters of the objects representing inputs to an arbitrary desired illumination model based on a set of shading operations for the objects;
determining, with the first set of processors for each pixel of an image plane subdivided into pixels for at least one camera view characterized by a set of camera view parameters, a set of values for object parameters for surface portions of one or more objects projected to the pixel;
generating, with the first set of processors, an object representation based on the set of values for object parameters for surface portions of the one or more objects for each pixel of the image plane;
for each of a plurality of the light sources:
generating, with a second set of processors associated with the data processing system including at least one processor having a parallel processing structure, information representing the interaction of the light source with the object representation according to the illumination model, and
caching the information representing the interaction of the light source with the object representation at a storage device associated with the second set of processors;
generating, with the second set of processors, composite lighting information representing the interaction of the plurality of light sources with the object representation based on combining the cached information for the plurality of light sources; and
generating an image with the data processing system in response to user input modifying one or more source parameters for a given light source, the image depicting the illuminated objects with the modified source parameters responsive to the substantially real time updating of the composite lighting information by the data processing device to account for the modified source parameters.

4. The method of claim 3 wherein updating of the composite lighting information by the data processing device to account for the modified source parameter comprises:
regenerating, with the second set of processors, the composite lighting information based on replacing the previously cached information for each light source with modified information and combining the cached information for the plurality of light sources to provide modified composite lighting information.

5. The method of claim 3 wherein generating information representing the interaction of a given light source with the stored object representation comprises executing a light shader for the given light with the second set of processors.

6. The method of claim 3 wherein generating information representing the interaction of a given light source with the stored object representation comprises executing a light shader for the given light with the second set of processors, the light shader being a translated version or a simplified version of a light shader for the given light that is used for production light shading.

7. The method of claim 3, further comprising:
receiving user input at the data processing system signifying a change in a lighting feature in the image depicting the illuminated objects;
in response to the user input, determining a light source associated with the lighting feature with the data processing system; and
modifying, in substantially real time with the data processing system, one or more source parameter values for the determined light source.

8. A computer-readable storage medium configured to store one or more software programs which when executed by the data processing system cause the data processing system to perform the steps recited in the method of claim 3.

9. A method for generating images of an illuminated scene, the method comprising:
receiving at one or more computer systems a set of computer-generated objects illuminated by one or more of a set of computer-generated light sources, each of the one or more objects characterized by a set of object parameters including at least one geometric parameter and at least one surface parameter that represents the surface's response to incident illumination, each of the one or more light sources characterized by a set of source parameters;
generating a set of surface response caches using a first set of processors associated with the one or more computer systems based on a set of surface shaders for the one or more objects, each surface response cache storing values for a respective object parameter for each of a plurality of pixel locations in an image plane, the values being determined independent of the light sources and representing inputs to an illumination model;
for each of a plurality of the light sources:
determining, using a second set of processors associated with the one or more computer systems including at least one processor having a parallel processing structure, a light contribution for the light source's interaction with the one or more objects according to the illumination model based on an executing a light shader for the light source with the surface response caches as inputs; and
generating, using the second set of processors, composite lighting information representing the interaction of the plurality of light sources with the objects based on combining the light contributions for the plurality of light sources;
receiving input at the one or more computer systems indicating a modification to one or more source parameters for a given light source; and
generating, using the second set of processors, an image depicting the illuminated objects with the modified one or more source parameters in response to re-executing the light shader for the given light source to modify the composite lighting information in substantially real time.

10. A computer-readable storage medium configured to store one or more software programs which when executed by the one or more computer systems cause the one or more computer systems to perform the steps recited in the method of claim 9.

11. A method for creating images of an illuminated scene, the scene being characterized by a set of computer-generated objects and a set of computer-generated light sources for illuminating the objects, wherein each of at least some of the computer-generated objects is characterized by a set of object parameters including one or more geometric parameters and one or more surface parameters, a surface parameter representing the surface's response to incident illumination, and each of at least some of the computer-generated light sources is characterized by a set of source parameters, the method comprising:
generating, at a first set of processors associated with a computer system, values corresponding to the surface parameters for the objects in response to performing a set of shading operations at the first set of processors;
generating, at the first set of processors, object information that includes values corresponding to object parameter for at least one of the objects to be lighted as viewed from a view point, the object information being independent of the light sources and providing inputs to an arbitrary desired illumination model, wherein the object information is substantially independent of geometric complexity and surface shading complexity; and
generating, at a second set of processors associated with the computer system including at least one processor having a parallel processing structure, information for each of a plurality of the light sources, the information representing the interaction of a light source with the object information according to the illumination model;
caching the information with the object information at a storage device associated with the second set of processors;
generating, at the second set of processors, composite lighting information representing the interaction of the plurality of light sources with the object information based on combining the information generating for each of the plurality of light sources;
in response to receiving user input signifying one or more changed source parameters for a given light source, generating, at the second set of processors in substantially real time, modified information for the interaction of the given light source with the illumination model in view of the one or more changed source parameters;
modifying, at the second set of processors, the composite lighting information to account for the one or more changed source parameters;
replacing previously cached information for the given light source with the modified information in substantially real time; and
generating, at the second set of processors, an image depicting the illuminated objects in view of the one or more changed source parameters using the composite lighting information, so modified;

wherein the interaction of the plurality of light sources with the objects is only re-computed for those light sources that undergo one or more changed source parameter values, thereby providing real-time feedback to user input signifying changed source parameter values.

12. A computer-readable storage medium configured to store one or more software programs which when executed by the computer system causes the computer system to perform the steps recited in the method of claim 11.

13. A method performed by a data processing device of using a stored object representation for interactively illuminating a set of computer-generated objects with a set of computer-generated light sources wherein each of at least some of the computer-generated light sources is characterized by a set of source parameters that provide inputs to an arbitrary desired illumination model, and wherein the object is in the form of image-space surface response caches that are independent of lights, the method comprising:

for each of a plurality of the light sources having respective sets of source parameter values, in a first set of processors including at least processor having a parallel processing structure, executing a corresponding light shader to generate information representing the interaction of that light source with the stored object representation according to the arbitrary desired illumination model, and caching the information representing the interaction of that light source with the stored object representation;

combining the cached information for the plurality of light sources at the first set of processors to provide composite lighting information representing the interaction of the plurality of light sources with the stored object representation for the particular sets of values for the light sources' source parameters;

displaying the composite lighting information in the form of an image depicting the illuminated objects; and in response to receiving user input signifying one or more changed source parameter values for a given light source, modifying, in substantially real time, the composite lighting information to account for the changed source parameter values, and displaying the composite lighting information, so modified, in the form of a modified image depicting the illuminated objects with the changed source parameter values.

14. A computer-readable storage medium configured to store one or more software programs which when executed by the data processing system causes the data processing systems to perform the steps recited in the method of claim 13.

* * * * *